United States Patent [19]

Nusser et al.

[11] Patent Number: 5,583,207
[45] Date of Patent: Dec. 10, 1996

[54] FIBRE-REACTIVE MONOAZO COPPER COMPLEXES CONTAINING A HALO SUBSTITUTED PYRIMIDINE SUBSTITUENT

[75] Inventors: Rainer Nusser, Müllheim, Germany; Roland Wald, Huningue, France

[73] Assignee: Sandoz Ltd., Basel, Switzerland

[21] Appl. No.: 431,652

[22] Filed: May 2, 1995

Related U.S. Application Data

[63] Continuation of Ser. No. 125,098, Sep. 22, 1993, abandoned.

[30] Foreign Application Priority Data

Sep. 24, 1992 [DE] Germany ............... 42 31 994.3
Jan. 9, 1993 [DE] Germany ............... 43 00 405.9

[51] Int. Cl.$^6$ ............ C09B 62/255; C09B 62/095; D06P 1/38; D06P 1/382
[52] U.S. Cl. ............ 534/624; 534/622; 534/627; 534/628; 534/634; 534/635; 534/637; 534/638
[58] Field of Search ............ 534/622, 624, 534/635, 637, 638, 627, 628

[56] References Cited

U.S. PATENT DOCUMENTS

| | | | |
|---|---|---|---|
| 3,342,798 | 9/1967 | Dussy et al. | 534/627 |
| 3,362,949 | 1/1968 | Benz et al. | 534/627 |
| 3,502,642 | 3/1970 | Dussy | 534/627 |
| 3,669,951 | 6/1972 | Bien et al. | |
| 4,007,164 | 2/1977 | Bien et al. | 534/627 |
| 4,294,580 | 10/1981 | Henk et al. | 8/549 |
| 4,548,777 | 10/1985 | Scholl et al. | 534/638 |
| 5,106,958 | 4/1992 | Koch | 534/622 |
| 5,227,477 | 7/1993 | Auerbach et al. | 534/634 |

FOREIGN PATENT DOCUMENTS

| | | | |
|---|---|---|---|
| 0085654 | 8/1983 | European Pat. Off. . | |
| 0453896 | 10/1991 | European Pat. Off. . | |
| 0457141 | 11/1991 | European Pat. Off. | 534/627 |
| 0513622 | 11/1992 | European Pat. Off. . | |
| 0526792 | 2/1993 | European Pat. Off. . | |
| 1419837 | 10/1968 | Germany | 534/622 |
| 2242507 | 3/1974 | Germany | 534/622 |
| 2655625C2 | 4/1986 | Germany | 534/622 |
| 3638817A1 | 5/1987 | Germany | 534/622 |
| 4013115A1 | 10/1991 | Germany | 534/622 |
| 1426382 | 2/1976 | United Kingdom | 534/622 |
| 1555642 | 11/1979 | United Kingdom . | |
| 2026527 | 2/1980 | United Kingdom . | |

*Primary Examiner*—Floyd D. Higel
*Attorney, Agent, or Firm*—Robert S. Honor; Carl W. Battle; Carol A. Loeschorn

[57] ABSTRACT

Fibre-reactive 1:1 copper complexes of the formula

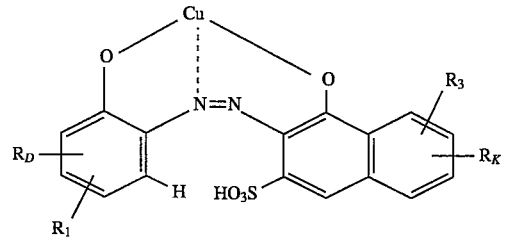

which compounds are in free acid or salt form, and mixtures thereof, are useful for dyeing or printing hydroxy group- or nitrogen-containing organic substrates, for example leather and fibre material comprising natural or synthetic polyamides or natural or regenerated cellulose; the most preferred substrate is a textile material comprising cotton.

19 Claims, No Drawings

FIBRE-REACTIVE MONOAZO COPPER COMPLEXES CONTAINING A HALO SUBSTITUTED PYRIMIDINE SUBSTITUENT

This is a continuation of application Ser. No. 08/125,098, filed Sep. 22, 1993, now abandoned.

This invention relates to copper complexes of fibre-reactive monoazo compounds and processes for their production. These complexes are suitable for use as fibre-reactive dyestuffs in any conventional dyeing or printing processes.

More particularly, the invention provides 1:1 copper complexes of formula I

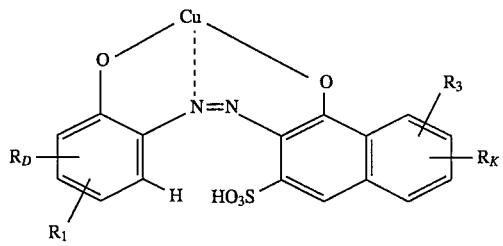

and salts thereof, or a mixture of such complexes or salts, in which $R_1$ is hydrogen, halogen, $C_{1-4}$alkyl, $C_{1-4}$alkoxy, carboxy or sulpho, $R_3$ is hydrogen or sulpho;

$R_D$ is hydrogen, sulpho or —$NR_2$—$Z_x$, and $R_K$ is hydrogen, sulpho or

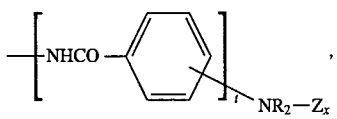

in which each $R_2$ is independently hydrogen, $C_{1-4}$alkyl or $C_{2-4}$hydroxy-alkyl, t is 0 or 1, and each $Z_x$ is independently $Z_a$ or

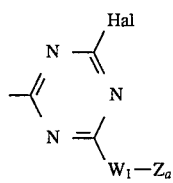

wherein $Z_a$ is

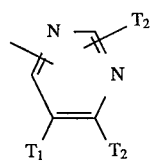

in which $T_1$ is hydrogen, chloro or cyano, and the two $T_2$'s are the same and each is fluoro or chloro;

Hal is fluoro or chloro, and $W_1$ is

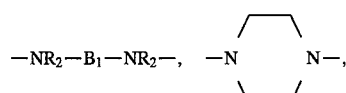

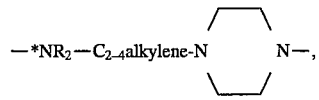

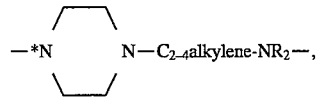

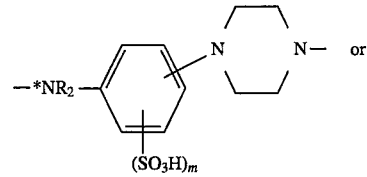

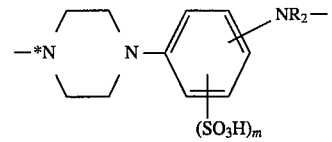

wherein m is 0 or 1 and the marked nitrogen atom is bound to a carbon atom of the triazine ring, $B_1$ is $C_{2-6}$alkylene; —$C_{2-3}$alkylene-Q—$C_{2-3}$alkylene- in which Q is —O— or —$NR_2$—; $C_{3-4}$alkylene monosubstituted by hydroxy,

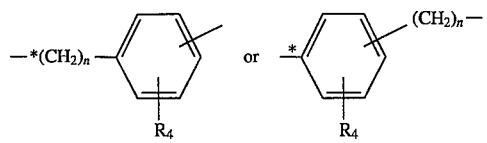

in which n is 0 or an integer 1 to 4, $R_4$ is hydrogen, $C_{1-4}$alkyl, $C_{1-4}$alkoxy, carboxy or sulpho, and the marked carbon atom is attached to the —$NR_2$ group which is bound to a carbon atom of the triazine ring, with the proviso that at least one of $R_D$ and $R_K$ is a $Z_x$-containing radical in which $Z_a$ is

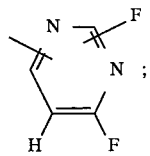

or $R_D$ and $R_K$, when $R_1$ is hydrogen or sulpho, are —$NR_2$—$Z_y$, where both groups $Z_y$ are the same and each $Z_y$ is $Z_b$ or

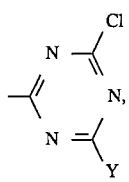

in which

Y is an unsubstituted or substituted amino group, $-W_1-Z_b$, or $-NR_2-W_2-SO_2-X$, wherein
  $W_1$ and $R_2$ are as defined above,
  $W_2$ is an aliphatic or aromatic bridging group which is further unsubstituted or substituted, or an aliphatic bridging group which is interrupted by $-O-$ or $-NR_2-$, and
  X is $-CH=CH_2$ or $-CH_2CH_2-T_x$ in which $T_x$ is hydroxy or a radical which can be split off under alkaline conditions; and $Z_b$ is a pyrimidinyl radical containing a labile fluoro or chloro substituent, with the proviso that each $Z_b$ is other than

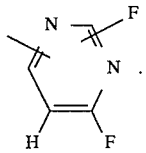

In the specification, any alkyl, alkoxy or alkylene group present is linear or branched unless indicated otherwise. In any hydroxysubstituted alkyl or alkylene group which is attached to a nitrogen atom, the hydroxy group is preferably bound to a carbon atom which is not directly attached to this nitrogen atom. In any alkylene chain interrupted by $-O-$ or $-NR_2-$ which is attached to a nitrogen atom, $-O-$ or $-NR_2-$ is preferably bound to a carbon atom which is not directly attached to the nitrogen atom.

Any halogen as a phenyl substituent is preferably fluorine, chlorine or bromine, especially chlorine.

$R_1$ is preferably $R_{1a}$, where $R_{1a}$ is hydrogen, chloro, methyl, methoxy, carboxy or sulpho; more preferably it is $R_{1b}$, where $R_{1b}$ is hydrogen or sulpho.

Each $R_2$ is preferably $R_{2a}$, where each $R_{2a}$ is independently hydrogen, methyl, ethyl or 2-hydroxyethyl; more preferably each $R_2$ is $R_{2b}$, where each $R_{2b}$ is independently hydrogen or methyl. Most preferably each $R_2$ is hydrogen.

Hal is most preferably chlorine.

$R_4$ is preferably $R_{4a}$, where $R_{4a}$ is hydrogen, methyl, methoxy, carboxy or sulpho; more preferably it is $R_{4b}$, where $R_{4b}$ is hydrogen or sulpho.

$B_1$ is preferably $B_{1a}$, where $B_{1a}$ is $C_{2-3}$alkylene, $-CH_2CH_2-O-CH_2CH_2-$, $-CH_2CH_2-NR_{2b}-CH_2CH_2-$, monohydroxy-substituted $C_{3-4}$alkylene,

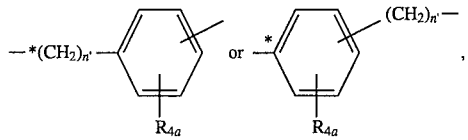

in which n' is 0 or 1.

$B_1$ is more preferably $B_{1b}$, where $B_{1b}$ is $C_{2-3}$alkylene, $-CH_2CH_2-NH-CH_2CH_2-$,

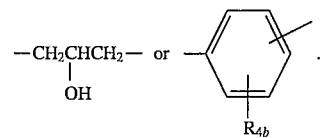

$B_1$ is most preferably $B_{1c}$, where $B_{1c}$ is $-CH_2CH_2-$, $-CH_2CH_2CH_2-$,

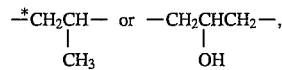

in which the marked carbon atom is bound to the $-NR_2$ group which is attached to a carbon atom of the triazine ring.

$W_1$ is preferably $W_{1a}$, where $W_{1a}$ is $-NR_{2a}-B_{1a}-NR_{2a}-$,

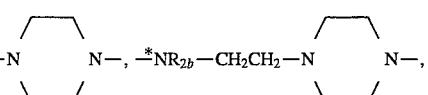

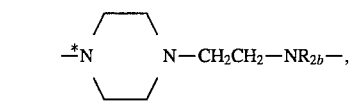

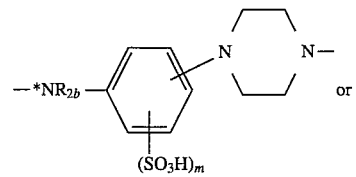

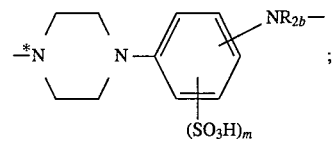

more preferably it is $W_{1b}$, where $W_{1b}$ is $-NR_{2b}-B_{1b}-NR_{2b}-$ or

most preferably $W_1$ is $W_{1c}$, where $W_{1c}$ is $-NH-B_{1c}-NH-$.

$Z_a$ is preferably $Z_a{}'$, where $Z_a{}'$ is

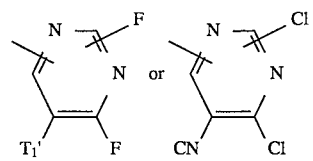

in which $T_1{}'$ is hydrogen or chloro.

$Z_x$ is preferably $Z_x'$, where $Z_x'$ is $Z_a'$ or

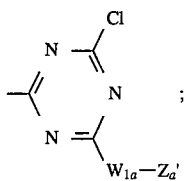

more preferably, it is $Z_x''$, where $Z_x''$ is $Z_a'$ or

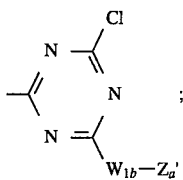

most preferably, it is $Z_x'''$, where $Z_x'''$ is

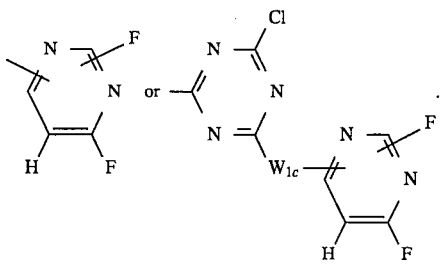

Any unsubstituted or substituted amino group as Y is preferably —$NR_5R_6$, in which $R_5$ is hydrogen, $C_{1-4}$alkyl or $C_{2-4}$alkyl which is monosubstituted by hydroxy, cyano or sulpho, and $R_6$ is hydrogen, $C_{1-4}$alkyl, $C_{2-4}$alkyl monosubstituted by hydroxy, cyano or sulpho; phenyl, phenyl substituted by one or two substituents selected from chloro, $C_{1-4}$alkyl, $C_{1-4}$alkoxy and sulpho, phenyl($C_{1-4}$alkyl) or phenyl($C_{1-4}$alkyl) the phenyl ring of which is substituted by one or two substituents selected from chloro, $C_{1-4}$alkyl, $C_{1-4}$alkoxy and sulpho, or —$NR_5R_6$ is piperidino or morpholino.

More preferably, Y as an amino group is —$NR_{5a}R_{6a}$, in which $R_{5a}$ is hydrogen, methyl, ethyl or 2-hydroxyethyl, and $R_{6a}$ is hydrogen, methyl, ethyl, 2-hydroxyethyl, phenyl or phenyl substituted by one or two substituents selected from methyl and sulpho, or —$NR_{5a}R_{6a}$ is morpholino.

Any aliphatic bridging group as $W_2$ is preferably linear or branched $C_{2-8}$alkylene which may be interrupted by —O— or —$NR_2$—, and which may be further substituted preferably by hydroxy or —$OSO_3H$.

Any aromatic bridging group as $W_2$ is preferably 1,3- or 1,4-phenylene which is unsubstituted or monosubstituted by sulpho or carboxy.

$W_2$ is preferably $W_{2a}$, where $W_{2a}$ is —$(CH_2)_{2-6}$—,

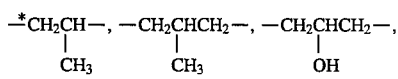

—$CH_2CHCH_2$—, —$CH_2CH_2$—$NR_{2b}$—$CH_2CH_2$— or
|
$OSO_3H$

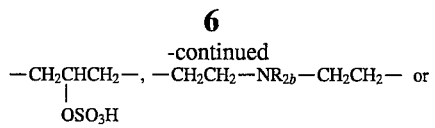

where the phenylene group is bound in the 1,3- or 1,4-positions, and in which the marked carbon atom is attached to the —$NR_2$ radical.

More preferably, $W_2$ is $W_{2b}$, where $W_{2b}$ is —$(CH_2)_{2-4}$— or

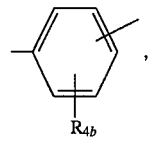

where the phenylene group is bound in the 1,3- or 1,4-positions.

Any $T_x$ which can be split off under alkaline conditions is for example —$OSO_3H$, Cl, Br, —$OPO_3H_2$, —$SSO_3H$, —$OCOC_6H_5$ or —$OSO_2CH_3$; most preferably, $T_x$ is OH or —$OSO_3H$.

X is preferably $X_a$, where $X_a$ is —$CH=CH_2$, —$CH_2CH_2OH$ or —$CH_2CH_2OSO_3H$; more preferably $X_b$, where $X_b$ is —$CH=CH_2$ or —$CH_2CH_2OSO_3H$; most preferably $X_c$, where $X_c$ is —$CH_2CH_2OSO_3H$.

Each $Z_b$ is preferably $Z_b'$, where $Z_b'$ has one of the formulae

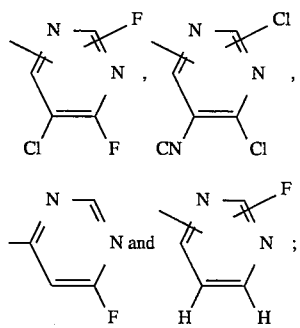

more preferably $Z_b''$, where $Z_b''$ is

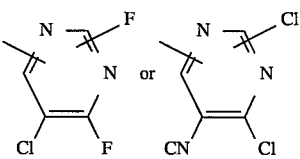

Y is preferably $Y_a$, where $Y_a$ is —$NR_5R_6$, —$W_{1a}$—$Z_b'$ or —$NR_{2a}$—$W_{2a}$—$SO_2$—$X_a$; more preferably $Y_b$ is —$NR_{5a}R_{6a}$, —$W_{1b}$—$Z_b'$ or —$NR_{2b}$—$W_{2b}$—$SO_2$—$X_b$; and most preferably $Y_c$, where $Y_c$ is —$W_{1c}$—$Z_b''$ or —NH—$W_{2b}$—$SO_2$—$X_c$.

$Z_y$ is preferably $Z_y'$, where $Z_y'$ is $Z_b'$ or
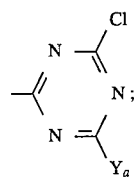
more preferably $Z_y''$, where $Z_y''$ is $Z_b''$ or
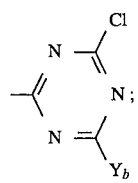
most preferably $Z_y'''$, where $Z_y'''$ is $Z_b''$ or
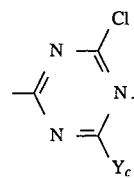
Preferred compounds of formula I correspond to formulae Ia to Id and salts thereof:
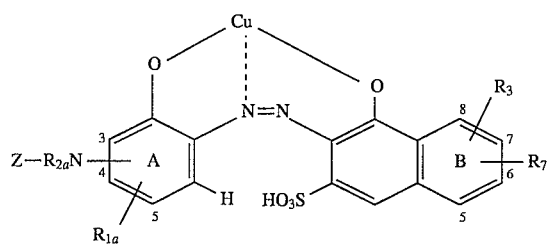
Ia
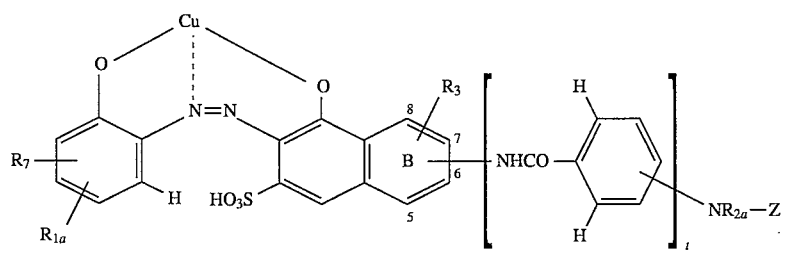
Ib
in which $R_7$ is hydrogen or sulpho, and Z is
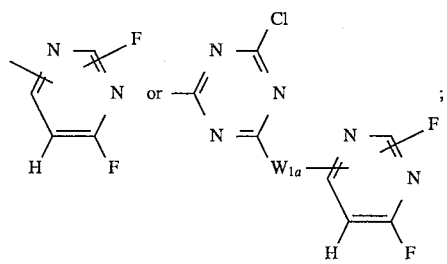
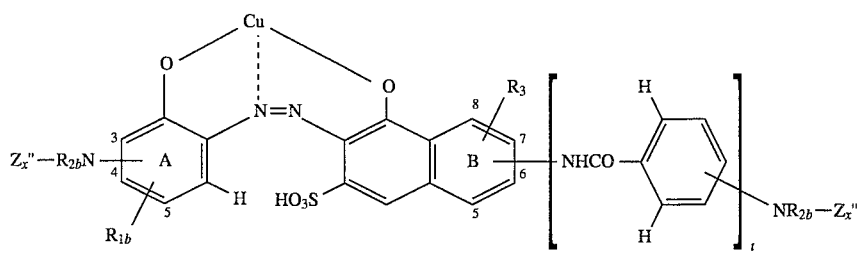
Ic in which the two $Z_x''$ may be the same or different and are preferably the same, and in which at least one of them is

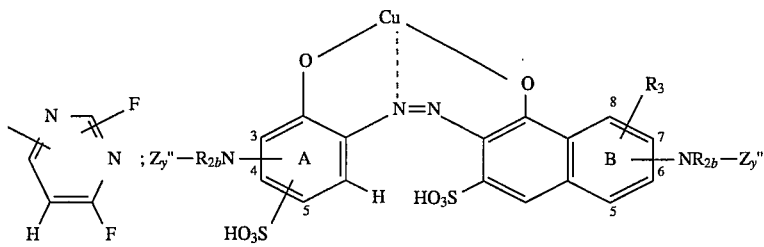

in which the two $Z_y''$ are the same.

Preferably, in ring A of the compounds of formula Ia, $R_{1a}$ is in the 5-position, and —$NR_{2a}$—Z is in the 3-position or, if $R_{1a}$ is hydrogen, also in the 4-position; when one of $R_3$ and $R_7$ is hydrogen and the other is sulpho, the sulpho group is preferably in the 6-position of ring B; when both $R_3$ and $R_7$ are sulpho, these two sulpho groups are preferably in the 6- and 8-positions.

Even more preferred are compounds of formula Ia in which (1) $R_{1a}$ is $R_{1b}$;
(2) $W_{1a}$ is $W_{1b}$;
(3) $W_{1a}$ is $W_{1c}$;
(4) $R_{2a}$ is $R_{2b}$;
(5) $R_{2a}$ is hydrogen;
(6) those of (1) to (5), in which $R_{1a}$ is sulpho in the 5-position and —$NR_{2a}$—Z is in the 3-position;
(7) those of (6), in which $R_3$ is hydrogen and $R_7$ is sulpho in the 6-position.

In the compounds of formula Ib, t is preferably 0 when Z is

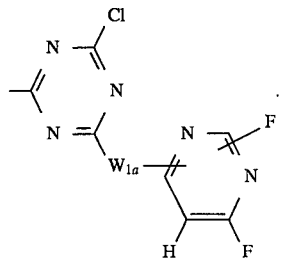

Furthermore, when $R_3$ is hydrogen, t is preferably 0 and —$NR_{2a}$—Z is preferably in the 6- or 7-position;

when $R_3$ is sulpho in the 6-position, Z is preferably

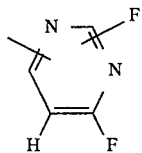

with the Z-containing radical in the 8-position.

Even more preferred are compounds of formula Ib in which (1) $W_{1a}$ is $W_{1b}$;
(2) $W_{1a}$ is $W_{1c}$;
(3) $R_{2a}$ is $R_{2b}$;
(4) those of (1) to (3) in which $R_{2a}$ is hydrogen.

In the compounds of formula Ic, the preferred positions of the substituents in ring A and ring B are as follows:

a) when $R_{1b}$ is hydrogen, —$NR_{2b}$—$Z_x''$ is preferably in position 3 or 4;

Id b) when $R_{1b}$ is sulpho in the 5-position, —$NR_{2b}$—$Z_x''$ is preferably in the 3-position;
$R_{1b}$ is more preferably sulpho;
c) when $R_3$ is hydrogen, the $Z_x''$-containing radical is preferably in the 6- or 7-position and t is preferably 0;
d) when $R_3$ is sulpho in the 6-position, t is preferably 1 and the $Z_x''$-containing radical in which $Z_x''$ is $Z_a'$, is preferably in the 8-position.

Even more preferred are compounds of formula Ic in which (1) each $R_{2b}$ is hydrogen;
(2) $R_{1b}$ is sulpho in the 5-position;
(3) those of (1) or (2), in which both $Z_x''$ are $Z_x'''$;
(4) those of (3), in which both $Z_x'''$ are

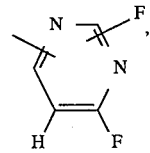

$R_3$ is hydrogen, t is 0 and —$NR_{2b}$—$Z_x'''$ is in the 7-position of ring B.

In the compounds of formula Id, the preferred positions of the substituents in ring A and in ring B are as follows:

$SO_3H$ and —$NR_{2b}$—$Z_y''$ in ring A are in the 3- and 5-positions with $SO_3H$ more preferably in the 5-position;

when $R_3$ is $SO_3H$ it is in the 5- or 6-position, more preferably in the 6-position of ring B, and —$NR_{2b}$—$Z_y''$ is in the 8-position; or when $R_3$ is hydrogen, —$NR_{2b}$—$Z_y''$ is in the 6- or 7-position of ring B.

Even more preferred are compounds of formula Id in which (1) both $Z_y''$ are $Z_y'''$ which are the same;
(2) each $R_{2b}$ is hydrogen.

When a compound of formula I is in salt form, the cation associated with the sulpho groups and any carboxy group is not critical and may be any one of those non-chromophoric cations conventional in the field of fibre-reactive dyes provided that the corresponding salts are water-soluble. Examples of such cations are alkali metal cations and unsubstituted and substituted ammonium cations, e.g., lithium, sodium, potassium, ammonium, mono-, di-, tri- and tetra-methylammonium, tri-ethylammonium and mono-, di- and tri- ethanolammonium.

The preferred cations are the alkali metal cations and ammonium, with sodium being the most preferred.

In a compound of formula I the cations of the sulpho and any carboxy groups can be the same or different, e.g., they can also be a mixture of the above mentioned cations meaning that the compound of formula I can be in a mixed salt form.

The invention further provides a process for the preparation of 1:1 copper complexes according to formula I or mixtures thereof, comprising reacting (i) 1 mole of a compound of formula II or III,

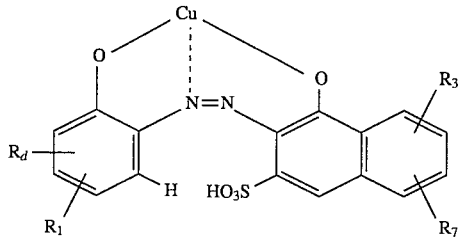

II

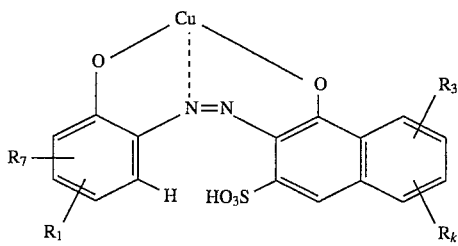

III in which $R_1$, $R_3$ and $R_7$ are as defined above, $R_d$ is —$NR_2$—H or

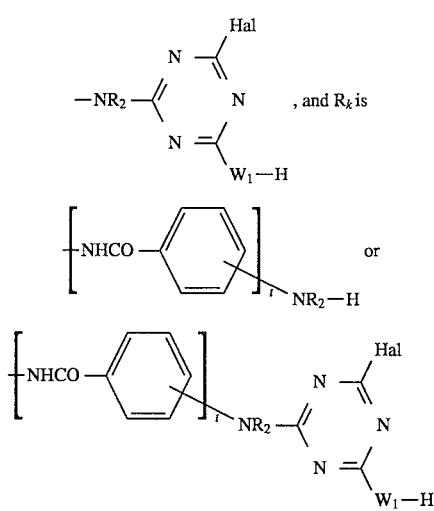

in which $R_2$, $W_1$, Hal and t are as defined above, with at least 1 mole of 2,4,6-trifluoropyrimidine; or (ii) 1 mole of a compound of formula IV,

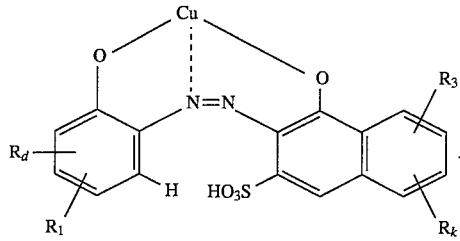

IV in which $R_1$, $R_3$, $R_d$ and $R_k$ are as defined above, with at least 1 mole of 2,4,6-trifluoropyrimidine and at least 1 mole of a compound $Z_a$—Hal in which Hal is fluoro or chloro and $Z_a$ is as defined above, or 1 mole of a compound of formula V,

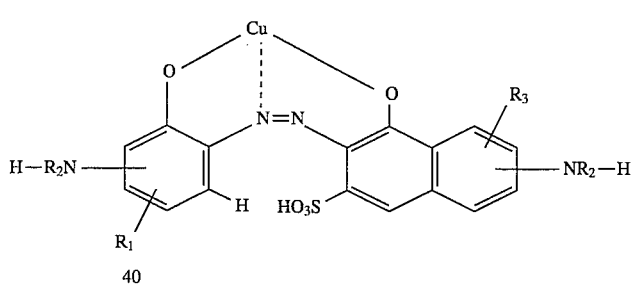

V in which $R_1$, $R_2$ and $R_3$ are as defined above, with at least 2 moles of a compound $Z_y$—Hal in which $Z_y$ is as defined above and Hal is fluoro or chloro.

These condensation reactions of an amino compound with a halo compound are carried out in accordance with known methods, preferably, when condensation takes place only on one side, at room temperature to slightly elevated temperature and, when condensation takes place on both sides at a temperature of from 10° to 60° C., and preferably at a pH of 6–7.

The condensation with $Z_y$—Hal can be carried out in a one step reaction or, when $Z_y$ is a triazinyl radical substituted by Y, in several steps.

The compounds of formula I may be isolated in accordance with known methods, for example, by conventional salting out with alkali metal salt, filtering and drying optionally in vacuo and at slightly elevated temperatures.

Depending on the reaction and isolation conditions a compound of formula I is obtained in free acid or preferably salt form or even mixed salt form containing, for example, one or more of the above mentioned cations. It may be converted from free acid form to a salt form or mixture of salt forms or vice versa or from one salt form to another by conventional means.

It should be noted that any group $Z_a$ corresponding to the formula

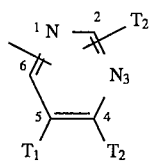

in which $T_1$ is hydrogen, cyano or chloro and $T_2$ is fluoro or chloro, or any group $Z_b$ containing a floating fluoro or chloro substituent, can occur in two isomeric forms, with the floating fluoro or chloro substituent in either the 2- or the 6-position.

In general, it is preferred to use this mixture of resulting dye-stuffs as it is without resorting to the isolation of a single isomer for use, but should this be desired it can be readily achieved by conventional methods.

The starting compounds of formulae II, III, IV and V as well as $Z_a$—Hal and $Z_y$—Hal are either known or may be readily made from known starting materials by known methods using conventional diazotising, coupling, oxidative or demethylation coppering and/or condensation reactions.

The compounds of formula I and mixtures thereof are useful as fibre-reactive dyestuffs for dyeing or printing hydroxy group- or nitrogen-containing organic substrates. Preferred substrates are leather and fibre material comprising natural or synthetic polyamides and, particularly, natural or regenerated cellulose such as cotton, viscose and spun rayon. The most preferred substrate is textile material comprising cotton.

Dyeing or printing is effected in accordance with known methods conventional in the fibre-reactive dyestuff field. Preferably, for the compounds of formula I the exhaust dyeing method is used at temperatures within the range of from 30° to 100° C., particularly at 50°–60° C. and 80°–100° C., respectively, whereby a liquor to goods ratio of 6:1 to 30:1 is used and more preferably of 10:1 to 20:1.

The compounds of this invention have good compatibility with known fibre-reactive dyes; they may be applied alone or in combination with appropriate fibre-reactive dyestuffs of the same class having analogous dyeing properties such as common fastness properties and the extent of ability to exhaust from the dyebath onto the fibre. The dyeings obtained with such combination mixtures have good fastness properties and are comparable to those obtained with a single dyestuff.

The compounds of formula I gave good exhaust and fixation yields when used as dyestuffs. Moreover, any unfixed compound is easily washed off the substrate. The dyeings and prints derived from the compounds of formula I exhibit good light fastness and good wet fastness properties such as wash, water, sea water and sweat fastness. They also exhibit good resistance to oxidation agents such as chlorinated water, hypochlorite bleach, peroxide bleach and perborate-containing washing detergents.

The following examples illustrate the invention. In the examples all parts and percentages are by weight unless indicated to the contrary, and all temperatures are given in degrees Centigrade.

EXAMPLE 1

78 Parts of the copper complex of the formula

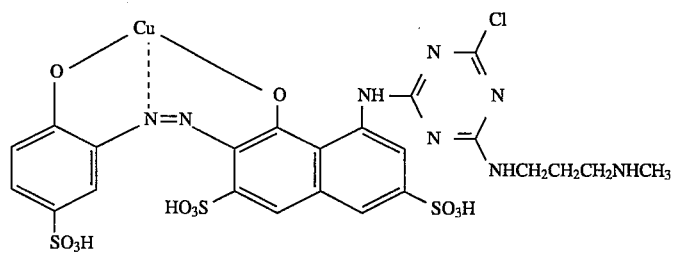

which has been prepared in accordance with a conventional method, are dissolved in 700 parts of water to yield a neutral solution (pH 7). To this solution, 14.7 parts of 2,4,6-trifluoropyrimidine are added, and stirring is effected at 20°–30° until the terminal free amino group is no longer detectable. During the condensation reaction the acid which has been set free is neutralised with 20% sodium carbonate solution to result in a reaction mixture of pH 6–7. The dyestuff thus obtained which corresponds to the formula (shown in free acid form)

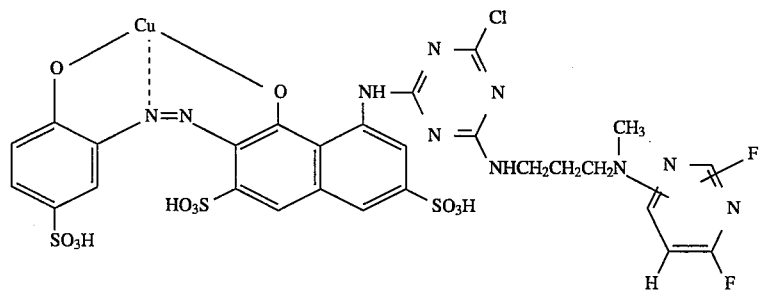

is salted out with sodium chloride, filtered off and dried under vacuum at 50°. With this dyestuff violet dyeings and prints are obtained which exhibit good fastness properties and are resistant to oxidative influences.

EXAMPLE 2

58.1 Parts of the aminoazo complex of the formula

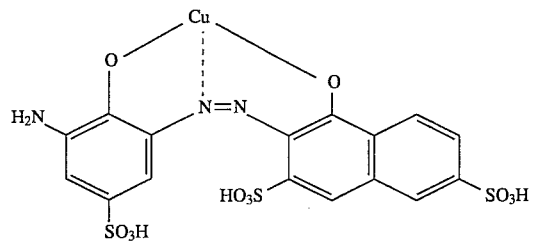

which has been prepared in accordance with a conventional manner, are dissolved in 1000 parts of water to yield a neutral solution (pH 7). 16.1 Parts of 2,4,6-trifluoropyrimidine are dropped into this solution whilst maintaining a pH of 6.5–7.0 by the continuous addition of 15% sodium carbonate solution. After the condensation is complete, the reaction mixture is cooled to room temperature and the dyestuff which corresponds to the formula (shown in free acid form)

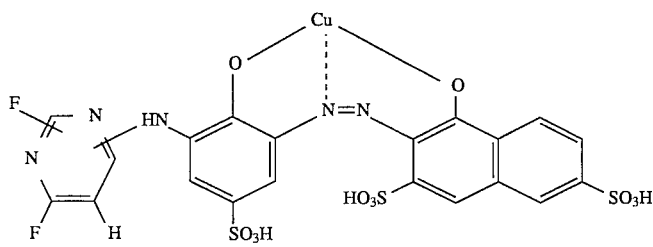

is salted out with sodium chloride, filtered off and dried under vacuum at 50°. It dyes cellulose material and especially cotton in ruby-red shades. These dyeings exhibit notably good fastness properties.

EXAMPLES 3 to 51

By analogy with the method described in Example 1 or 2, using appropriate starting compounds, further 1:1 copper complexes of formula I can be prepared which are listed in the following Tables 1 to 3. These complexes correspond to the formulae (T1)–(T3) where each of the corresponding formulae is set forth on the top of each Table in which the symbols are defined.

In Tables 1 and 3 in the column of $-W_1-$ the marked nitrogen atom is attached to a carbon atom of the triazine ring.

The compounds of Examples 3 to 51 may be applied to substrates which comprise cellulose fibres, and particularly to textile material comprising cotton using the conventional exhaust dyeing method or conventional printing processes, where dyeings or prints in ruby-red to violet shades are obtained. These dyeings and prints on cotton show good light- and wet-fastness properties and are resistant to oxidative influences.

TABLE 1

Examples 3–20
Compounds of formula (T1)

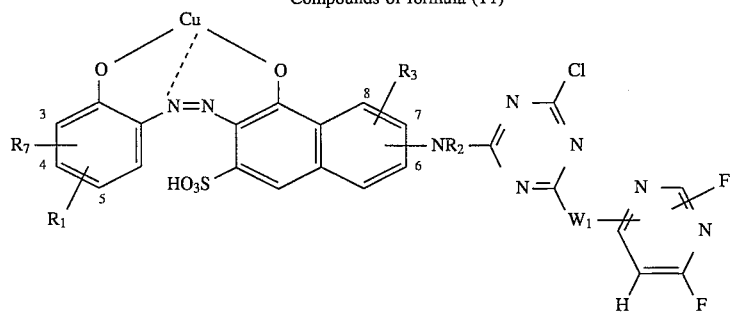

(T1)

| Ex.No. | $R_1$ | $R_7$ | $R_3$ | $R_2$ | position of $-NR_2-$ | $-W_1-$ |
|---|---|---|---|---|---|---|
| 3 | H | 5-SO$_3$H | 6-SO$_3$H | H | 8 | $-NHCH_2CH_2CH_2NH-$ |
| 4 | H | " | H | H | 6 | " |
| 5 | H | " | H | H | 6 | $-*NHCH_2CHNH-$<br>$\quad\quad\quad\;\;\vert$<br>$\quad\quad\quad\;\;CH_3$ |

TABLE 1-continued

Examples 3–20
Compounds of formula (T1)

(T1)

| Ex.No. | R₁ | R₇ | R₃ | R₂ | position of —NR₂— | —W₁— |
|---|---|---|---|---|---|---|
| 6 | H | " | H | H | 7 | " |
| 7 | 3-COOH | H | H | H | 7 | " |
| 8 | H | 5-SO₃H | H | CH₃ | 6 | " |
| 9 | H | " | H | " | 6 | —NHCH₂CH(OH)CH₂NH— |
| 10 | 3-Cl | " | 6-SO₃H | H | 8 | " |
| 11 | H | " | " | H | 8 | " |
| 12 | H | " | H | H | 7 | " |
| 13 | 3-COOH | H | H | CH₃ | 6 | " |
| 14 | H | 5-SO₃H | H | —CH₂CH₃ | 7 | " |
| 15 | H | " | H | H | 6 | " |
| 16 | 3-SO₃H | H | 6-SO₃H | H | 8 | —*NHCH₂CH(CH₃)NH— |
| 17 | 3-Cl | 5-SO₃H | H | CH₃ | 6 | " |
| 18 | H | " | 6-SO₃H | H | 8 | —N(piperazine)N— |
| 19 | H | " | H | H | 6 | " |
| 20 | H | " | H | CH₃ | 7 | —NHCH₂CH₂CH₂NH— |

TABLE 2

Examples 21–34
Compounds of formula (T2)

(T2)

| Ex.No. | R₁ | R₇ | R₃ | t | position of —NHCO— | R₂ | position of —NR₂— |
|---|---|---|---|---|---|---|---|
| 21 | H | 5-SO₃H | H | 0 | — | H | 6 |
| 22 | 3-SO₃H | " | H | 0 | — | H | 6 |
| 23 | " | " | H | 0 | — | H | 7 |
| 24 | H | " | 6-SO₃H | 0 | — | H | 8 |
| 25 | H | " | H | 0 | — | H | 7 |

TABLE 2-continued

Examples 21–34
Compounds of formula (T2)

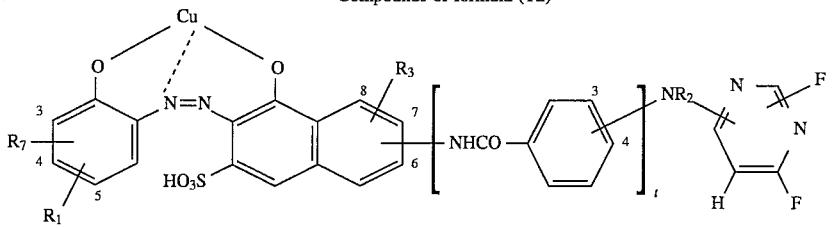

(T2)

| Ex.No. | R₁ | R₇ | R₃ | t | position of —NHCO— | R₂ | position of —NR₂— |
|---|---|---|---|---|---|---|---|
| 26 | 3-Cl | " | H | 0 | — | H | 6 |
| 27 | 3-SO₃H | H | H | 0 | — | CH₃ | 6 |
| 28 | 3-CH₃ | 5-SO₃H | H | 0 | — | H | 7 |
| 29 | 3-Cl | " | 6-SO₃H | 1 | 8 | H | 4 |
| 30 | H | " | " | 1 | 8 | H | 3 |
| 31 | 3-SO₃H | " | " | 1 | 8 | H | 3 |
| 32 | H | " | " | 1 | 8 | CH₃ | 4 |
| 33 | 3-SO₃H | " | " | 1 | 8 | " | 4 |
| 34 | 3-COOH | H | " | 1 | 8 | H | 3 |

TABLE 3

Examples 35–51
Compounds of formula (T3)

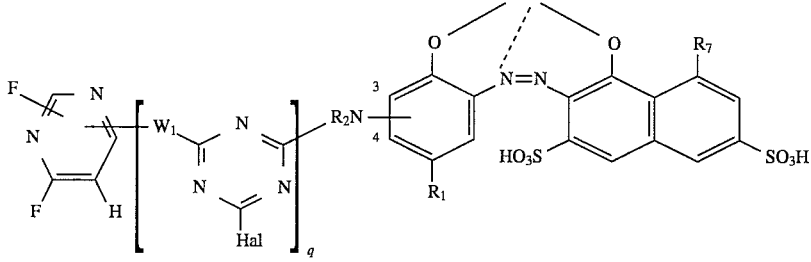

(T3)

| Ex.No. | R₁ | R₂ | position of —NR₂— | R₇ | q | Hal | —W₁— |
|---|---|---|---|---|---|---|---|
| 35 | H | H | 4 | SO₃H | 0 | — | — |
| 36 | SO₃H | H | 3 | " | 0 | — | — |
| 37 | " | CH₃ | 3 | H | 0 | — | — |
| 38 | " | " | 3 | SO₃H | 1 | Cl | —NHCH₂CH₂CH₂NH— |
| 39 | H | H | 4 | " | 1 | Cl | " |
| 40 | SO₃H | H | 3 | H | 1 | Cl | " |
| 41 | " | H | 3 | H | 1 | Cl | —*NHCH₂CH₂CH₂N—<br>\|<br>CH₃ |
| 42 | " | H | 3 | H | 1 | F | " |
| 43 | " | H | 3 | H | 1 | Cl | —*NHCH₂CHNH—<br>\|<br>CH₃ |
| 44 | H | H | 4 | SO₃H | 1 | Cl | " |
| 45 | H | CH₃ | 3 | " | 1 | Cl | " |
| 46 | H | H | 4 | " | 1 | F | " |
| 47 | H | H | 4 | " | 1 | Cl | —NHCH₂CHCH₂NH—<br>\|<br>OH |
| 48 | SO₃H | H | 3 | " | 1 | Cl | " |
| 49 | " | H | 3 | H | 1 | Cl | " |

TABLE 3-continued

Examples 35–51
Compounds of formula (T3)

(T3)

| Ex.No. | $R_1$ | $R_2$ | position of $-NR_2-$ | $R_7$ | q | Hal | $-W_1-$ |
|---|---|---|---|---|---|---|---|
| 50 | " | H | 3 | H | 1 | Cl | $-N\underset{\phantom{x}}{\diagdown}N-$ (piperazine) |
| 51 | " | $-CH_2CH_2OH$ | 3 | H | 1 | Cl | " |

EXAMPLE 52

51.6 Parts of the aminoazo complex of the formula

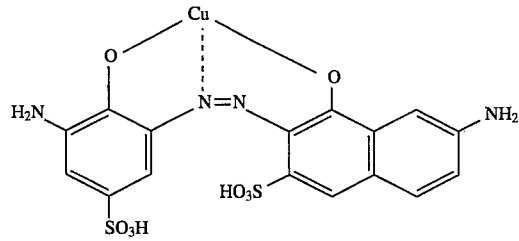

which has been prepared in accordance with a conventional method, are dissolved in 1000 parts of water to yield a solution of pH 7. At 40°–45°, 34.5 parts of 2,4,6-trifluoropyrimidine are dropped into this solution whilst maintaining the pH at 6.5–7.0 by the continuous addition of 15% sodium carbonate solution. After the condensation has been completed, the reaction mixture is cooled to room temperature. The dyestuff thus obtained which corresponds to the formula

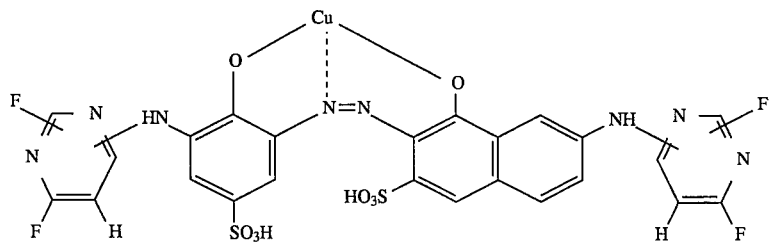

is salted out with sodium chloride, filtered off and dried in vacuo at 50°. It dyes cellulose material and especially cotton ruby-red, the resultant dyeings show notably good fastness properties.

EXAMPLE 53

59.6 Parts of the aminoazo compound of the formula

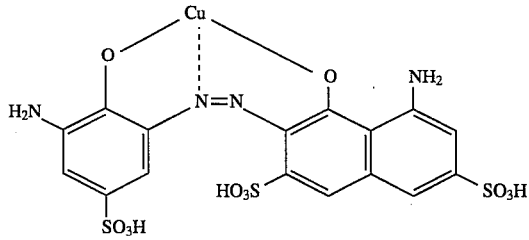

are dissolved in 700 parts of water. This solution is dropped into a suspension of 37 parts of cyanuric chloride in 300 parts of water at 15°–20°. During the addition the pH is kept at 6.0–7.0 by continuously adding 15% sodium carbonate solution. After the condensation is complete, the mixture is heated to 50°–60° and 29.5 parts of N-ethyl-2-methylaniline at pH 6.5–7.5 are added thereto. The reaction product is salted out with sodium chloride, filtered off and dried under vacuum at 50°. The dyestuff thus obtained corresponds to the formula

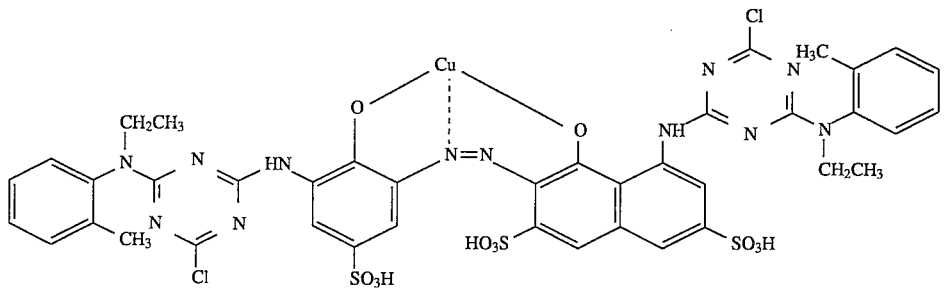

and dyes cellulose material and especially cotton in violet shades. These dyeings exhibit notably good fastness properties.

EXAMPLES 54 to 134

By analogy with the method described in Example 52 or 53, using appropriate starting compounds, further 1:1 copper complexes of formula I can be prepared which are listed in the following Tables 4 and 5. They correspond to the formulae (T4) and (T5), where each formula is set forth on the top of the corresponding Table in which the symbols are defined.

In these Tables the following symbols are used:

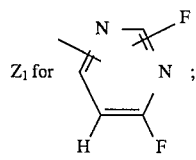

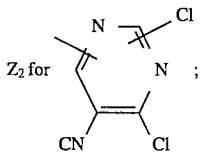

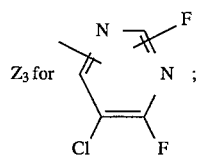

$X_T$ for $-CH_2CH_2OSO_3H$.

The dyestuffs of Examples 54 to 134 may be applied to substrates which comprise cellulose fibres, and particularly to textile material comprising cotton using the conventional exhaust dyeing method or conventional printing processes, where dyeings or prints in ruby-red to violet shades are obtained. These dyeings and prints on cotton show good light- and wet-fastness properties and are resistant to oxidative influences.

TABLE 4

Examples 54–69
Compounds of formula (T4)

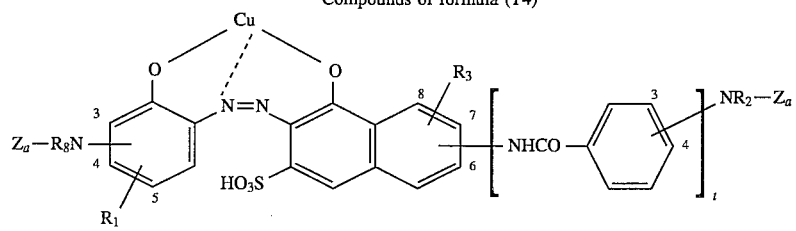

(T4)

in which the two $Z_a$'s are the same.

| Ex.No. | $Z_a$ | $R_8$ | position of $-NR_8-$ | $R_1$ (position) | $R_3$ (position) | t | position of $-NHCO-$ | $R_2$ | position of $-NR_2-$ |
|---|---|---|---|---|---|---|---|---|---|
| 54 | $Z_1$ | H | 3 | 5-SO$_3$H | H | 0 | — | H | 6 |
| 55 | " | H | 3 | " | 6-SO$_3$H | 0 | — | H | 8 |
| 56 | " | CH$_3$ | 3 | " | H | 0 | — | H | 6 |
| 57 | " | H | 4 | H | 6-SO$_3$H | 0 | — | H | 8 |
| 58 | " | H | 4 | H | H | 0 | — | CH$_3$ | 6 |
| 59 | " | H | 3 | 5-SO$_3$H | H | 0 | — | " | 7 |
| 60 | " | H | 4 | H | 6-SO$_3$H | 1 | 8 | " | 4 |
| 61 | " | H | 3 | 5-SO$_3$H | H | 1 | 6 | H | 4 |
| 62 | " | H | 3 | " | H | 1 | 7 | H | 3 |
| 63 | $Z_3$ | H | 3 | " | H | 0 | — | H | 7 |

TABLE 4-continued

Examples 54–69
Compounds of formula (T4)

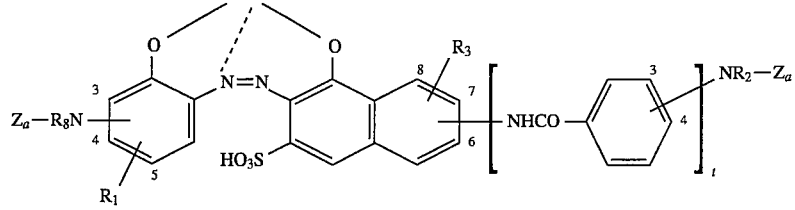

(T4)

in which the two $Z_a$'s are the same.

| Ex.No. | $Z_a$ | $R_8$ | position of $-NR_8-$ | $R_1$ (position) | $R_3$ (position) | t | position of $-NHCO-$ | $R_2$ | position of $-NR_2-$ |
|---|---|---|---|---|---|---|---|---|---|
| 64 | $Z_2$ | H | 3 | " | H | 0 | — | H | 7 |
| 65 | $Z_3$ | H | 3 | " | H | 0 | — | H | 6 |
| 66 | $Z_2$ | H | 3 | " | H | 0 | — | H | 6 |
| 67 | $Z_3$ | H | 3 | " | 6-$SO_3H$ | 0 | — | H | 8 |
| 68 | $Z_2$ | $CH_3$ | 3 | " | " | 0 | — | $CH_3$ | 8 |
| 69 | $Z_3$ | H | 5 | 3-$SO_3H$ | 5-$SO_3H$ | 0 | — | H | 8 |

TABLE 5

Examples 70–134
Compounds of formula (T5)

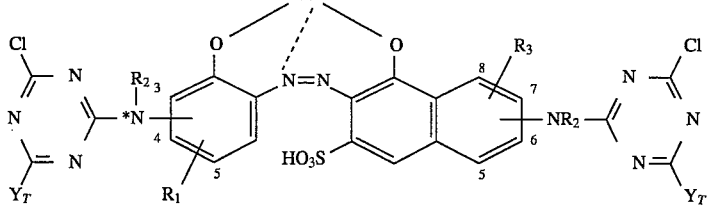

(T5)

in which the two $Y_T$'s and the two $R_2$'s are the same.

| Ex.No. | $Y_T$ | $R_2$ | position of $-*NR_2-$ | $R_1$ (position) | $R_3$ | position of $-NR_2-$ |
|---|---|---|---|---|---|---|
| 70 | -N(CH₂CH₃)-(2-CH₃-phenyl) | H | 3 | 5-$SO_3H$ | H | 7 |
| 71 | -N(CH₃)-(2-CH₃-phenyl) | H | 3 | " | H | 7 |
| 72 | -NH-(2,5-di-$SO_3H$-phenyl) | H | 3 | " | H | 7 |
| 73 | " | H | 3 | " | 6-$SO_3H$ | 8 |
| 74 | " | H | 5 | 3-$SO_3H$ | H | 6 |
| 75 | -NH-(3,5-di-$SO_3H$-phenyl) | H | 3 | 5-$SO_3H$ | H | 7 |

TABLE 5-continued

Examples 70–134
Compounds of formula (T5)

$$\text{(T5)}$$

in which the two $Y_T$'s and the two $R_2$'s are the same.

| Ex.No. | $Y_T$ | $R_2$ | position of —*$NR_2$— | $R_1$ (position) | $R_3$ | position of —$NR_2$— |
|---|---|---|---|---|---|---|
| 76 | —NH—C₆H₄—SO₃H | H | 3 | " | 6-SO₃H | 8 |
| 77 | —NH—C₆H₄(SO₃H) (ortho) | H | 5 | 3-SO₃H | 5-SO₃H | 8 |
| 78 | —NH—C₆H₃(SO₃H)—NH—Z₁ | H | 3 | 5-SO₃H | H | 7 |
| 79 | —NH—C₆H₃(SO₃H)—NH—Z₁ | H | 5 | 3-SO₃H | H | 6 |
| 80 | " | H | 3 | 5-SO₃H | 6-SO₃H | 8 |
| 81 | —NH—C₆H₃(SO₃H)—NH—Z₃ | H | 3 | " | H | 7 |
| 82 | " | CH₃ | 3 | " | H | 6 |
| 83 | " | H | 3 | " | 6-SO₃H | 8 |
| 84 | —NH—C₆H₃(SO₃H)—NH—Z₂ | H | 5 | 3-SO₃H | 5-SO₃H | 8 |
| 85 | —NH—C₆H₃(SO₃H)—NH—Z₂ | H | 3 | 5-SO₃H | 6-SO₃H | 8 |
| 86 | —NH—C₆H₃(SO₃H)—NH—Z₁ | H | 3 | " | H | 7 |
| 87 | " | H | 5 | 3-SO₃H | H | 7 |
| 88 | " | CH₃ | 3 | 5-SO₃H | H | 6 |
| 89 | " | H | 3 | " | 6-SO₃H | 8 |
| 90 | " | H | 5 | 3-SO₃H | 5-SO₃H | 8 |

TABLE 5-continued

Examples 70–134
Compounds of formula (T5)

(T5)

in which the two $Y_T$'s and the two $R_2$'s are the same.

| Ex.No. | $Y_T$ | $R_2$ | position of —*$NR_2$— | $R_1$ (position) | $R_3$ | position of —$NR_2$— |
|---|---|---|---|---|---|---|
| 91 | —NH—⟨SO₃H⟩—NH—$Z_3$ | H | 3 | 5-SO₃H | H | 7 |
| 92 | " | H | 5 | 3-SO₃H | 6-SO₃H | 8 |
| 93 | —NH(CH₂)₃NH—$Z_1$ | H | 3 | 5-SO₃H | H | 7 |
| 94 | " | CH₃ | 3 | " | H | 6 |
| 95 | " | H | 3 | " | 6-SO₃H | 8 |
| 96 | " | H | 3 | " | 5-SO₃H | 8 |
| 97 | —NH(CH₂)₃NH—$Z_3$ | H | 3 | " | H | 7 |
| 98 | " | CH₃ | 3 | " | H | 6 |
| 99 | " | H | 3 | " | H | 6 |
| 100 | " | H | 5 | 3-SO₃H | 6-SO₃H | 8 |
| 101 | —NH(CH₂)₃NH—$Z_2$ | H | 3 | 5-SO₃H | " | 8 |
| 102 | —NHCH₂CHNH—$Z_1$ (CH₃) | H | 3 | " | H | 7 |
| 103 | " | H | 3 | " | 6-SO₃H | 8 |
| 104 | " | H | 5 | 3-SO₃H | H | 6 |
| 105 | —NHCH₂CHNH—$Z_3$ (CH₃) | H | 3 | 5-SO₃H | H | 7 |
| 106 | " | H | 5 | 3-SO₃H | H | 7 |
| 107 | " | CH₃ | 3 | 5-SO₃H | H | 6 |
| 108 | " | H | 3 | " | 6-SO₃H | 8 |
| 109 | —NHCH₂CHNH—$Z_2$ (CH₃) | H | 3 | " | " | 8 |
| 110 | —NHCH₂CHCH₂NH—$Z_1$ (OH) | H | 3 | " | H | 7 |
| 111 | " | CH₃ | 3 | " | H | 6 |
| 112 | " | H | 3 | " | 6-SO₃H | 8 |
| 113 | " | H | 5 | 3-SO₃H | " | 8 |
| 114 | —NHCH₂CHCH₂NH—$Z_3$ (OH) | H | 3 | 5-SO₃H | H | 7 |
| 115 | " | H | 3 | " | 6-SO₃H | 8 |
| 116 | " | H | 5 | 3-SO₃H | " | 8 |
| 117 | —NHCH₂CHCH₂NH—$Z_2$ (OH) | H | 3 | 5-SO₃H | 6-SO₃H | 8 |
| 118 | —N⟨  ⟩N—$Z_2$ | H | 3 | " | " | 8 |
| 119 | —N⟨  ⟩N—$Z_1$ | H | 3 | " | " | 8 |

TABLE 5-continued

Examples 70–134
Compounds of formula (T5)

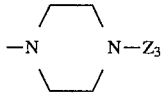

in which the two $Y_T$'s and the two $R_2$'s are the same.

| Ex.No. | $Y_T$ | $R_2$ | position of $-*NR_2-$ | $R_1$ (position) | $R_3$ | position of $-NR_2-$ |
|---|---|---|---|---|---|---|
| 120 | " | H | 5 | 3-SO$_3$H | " | 8 |
| 121 | $-N\diagdown N-Z_3$ | H | 3 | 5-SO$_3$H | " | 8 |
| 122 | " | H | 5 | 3-SO$_3$H | " | 8 |
| 123 | " | H | 3 | 5-SO$_3$H | H | 7 |
| 124 | $-NH-\bigcirc-SO_2-X_T$ | H | 3 | " | 6-SO$_3$H | 8 |
| 125 | " | H | 3 | " | H | 7 |
| 126 | " | CH$_3$ | 3 | " | H | 6 |
| 127 | $-NH-\bigcirc-SO_2-X_T$ | " | 3 | " | H | 6 |
| 128 | " | H | 3 | " | 6-SO$_3$H | 8 |
| 129 | " | H | 3 | " | H | 7 |
| 130 | $-NH(CH_2)_3SO_2-X_T$ | H | 3 | " | H | 7 |
| 131 | " | H | 5 | 3-SO$_3$H | H | 7 |
| 132 | " | H | 3 | 5-SO$_3$H | H | 6 |
| 133 | " | H | 3 | " | 6-SO$_3$H | 8 |
| 134 | " | H | 5 | 3-SO$_3$H | 5-SO$_3$H | 8 |

By the preparation method described in Examples 1, 2, 52 and 53, the compounds of Examples 1–134 are obtained in their sodium salt form. By changing the reaction or isolation conditions or by using other known methods, it is possible to produce the compounds in the form of free acid or in other salt forms or mixed salt forms which contain one or more of the cations mentioned hereinabove.

As already mentioned hereinbefore in the description, those exemplified dyestuffs (and the corresponding free acids and other salt forms) which contain a pyrimidinyl radical with a floating fluoro or chloro substituent according to the formula

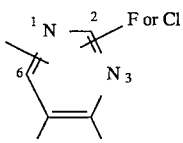

contain two isomeric compounds regarding the above radical; one compound in which the floating fluoro or chloro substituent on the pyrimidine ring is in the 2-position and the corresponding compound wherein it is in the 6-position. The obtained mixtures of isomeric dyestuffs may be used in conventional dyeing or printing processes; the isolation of a single isomer for use normally is unnecessary.

In the following examples, the application of the 1:1 copper complexes of this invention is illustrated.

Application Example A 0.3 Part of the dyestuff of Example 2 is dissolved in 100 parts of demineralised water and 8 parts of Glauber's salt (calcined) are added. The dyebath is heated to 50°, then 10 parts of cotton fabric (bleached) are added. After 30 minutes at 50°, 0.4 part of sodium carbonate (calcined) is added to the bath. During the addition of sodium carbonate the temperature is kept at 50°. Subsequently, the dyebath is heated to 60°, and dyeing is effected for a further one hour at 60°.

The dyed fabric is then rinsed with running cold water for 3 minutes and afterwards with running hot water for a further 3 minutes. The dyeing is washed at the boil for 15 minutes in 500 parts of demineralised water in the presence of 0.25 part of Marseille soaps. After being rinsed with running hot water (for 3 minutes) and centrifuged, the dyeing is dried in a cabinet dryer at about 70°. A ruby cotton dyeing is obtained showing good fastness properties, and particularly high wet fastness properties, which is stable towards oxidative influences.

Application Example B

To a dyebath containing in 100 parts of demineralised water 5 parts of Glauber's salt (calcined), 10 parts of cotton fabric (bleached) are added. The bath is heated to 50° within 10 minutes, and 0.5 part of the dyestuff of Example 2 is added. After a further 30 minutes at 50°, 1 part of sodium carbonate (calcined) is added. The dyebath is then heated to 60° and dyeing is continued at 60° for a further 45 minutes.

The dyed fabric is rinsed with running cold and then hot water and washed at the boil according to the method given in Application Example A. After rinsing and drying a ruby cotton dyeing is obtained which has the same good fastness properties as indicated in Application Example A.

Similarly, the dyestuffs of Examples 1, 3–52, 54–69 and 78–134 or mixtures of the exemplified dyestuffs may be employed to dye cotton in accordance with the method described in Application Example A or B. The cotton dyeings thus obtained are ruby-red to violet and show good fastness properties.

Application Example C

50 Parts of mercerized cotton fabric are added to a dyebath consisting of 1000 parts of water, 20 parts of Glauber's salt (calcined), 2.5 parts of sodium carbonate (calcined) and 1 part of the sodium salt of 1-nitrobenzene-3-sulphonic acid. The bath is heated to 40°, then 1 part of the dyestuff of Example 53 is added. The temperature is raised to 98° over 45 minutes. During this time, 20 parts of Glauber's salt (calcined) are added after 15 minutes and a further 20 parts of Glauber's salt (calcined) are added after a further 15 minutes. At the end of this time 7.5 parts of sodium carbonate (calcined) are added. Dyeing is continued at the boil for 45 to 60 minutes. Subsequently, the dyed fabric is removed from the liquor, rinsed with running hot water, and washed at the boil according to the method given in Application Example A. After rinsing and drying a violet cotton dyeing is obtained which exhibits good fastness properties.

Application Example D

1 Part of the dyestuff of Example 53 is dissolved in 2000 parts of water. 100 Parts of cotton fabric are added and the temperature of the dyebath is raised to 80° over 10 minutes. 100 Parts of Glauber's salt (calcined) are added and 20 parts of sodium carbonate (calcined) are added over 30 minutes. Dyeing is continued for one hour at 80°. Subsequently, the dyed fabric is rinsed with cold running water and then with hot water, and is washed at the boil as in Application Example A. After rinsing and drying, a violet cotton dyeing is obtained having good fastness properties.

Similarly, the dyestuffs of Examples 70–77 or mixtures of these dyestuffs may be employed to dye cotton in accordance with the method described in Application Example C or D. These cotton dyeings are violet and show good fastness properties.

Application Example E

A printing paste consisting of
40 parts of the dyestuff of Example 2
100 parts of urea
350 parts of water
500 parts of a 4% sodium alginate thickener and
10 parts of sodium bicarbonate
1000 parts in all
is applied to cotton fabric in accordance with conventional printing methods.

The printed fabric is dried and fixed in steam at 102°–104° for 4–8 minutes. It is rinsed in cold and then hot water, washed at the boil (according to the method described in Application Example A) and dried. A ruby print is obtained which has good general fastness properties.

Similarly, the dyestuffs of Examples 1 and 3–134 or mixtures of the exemplified dyestuffs may be employed to print cotton in accordance with the method given in Application Example E. All prints obtained are ruby to violet and show good fastness properties.

What is claimed is:

1. A 1:1 copper complex of formula I

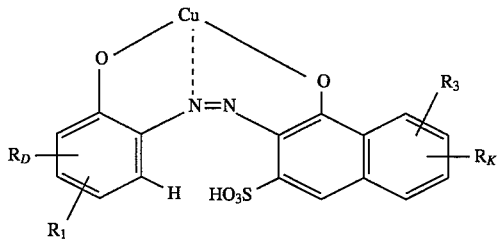

or a salt thereof, or a mixture of such complexes or salts, in which $R_1$ is hydrogen, halogen, $C_{1-4}$alkyl, $C_{1-4}$alkoxy, carboxy or sulpho;

$R_3$ is hydrogen, or sulpho;

$R_D$ is hydrogen, sulpho or —$NR_2$—$Z_x$; and $R_K$ is hydrogen, sulpho or

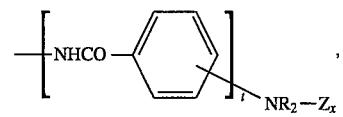

in which each $R_2$ is independently hydrogen, $C_{1-4}$alkyl or $C_{2-4}$hydroxyalkyl, t is 0 or 1, and each $Z_x$ is independently $A_a$ or

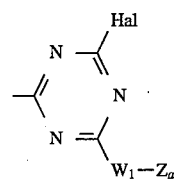

wherein $Z_a$ is

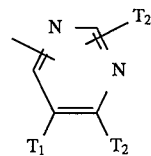

in which $T_1$ is hydrogen, chloro or cyano, and the two $T_2$'s are the same and each is fluoro or chloro, Hal is fluoro or chloro; and $W_1$ is —NR$_2$—B$_1$—NR$_2$—,  —N(piperazine)N—,

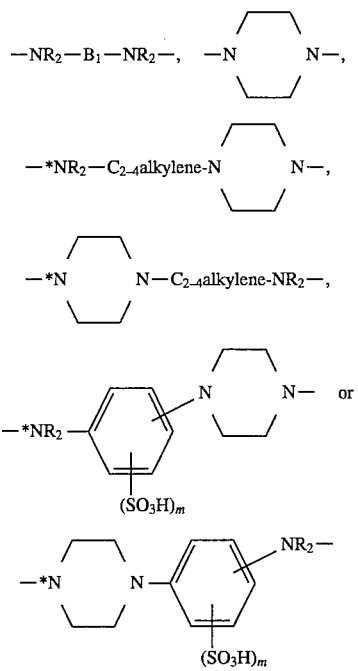

wherein
m is 0 or 1 and the marked nitrogen atom is bound to a carbon atom of the triazine ring,
B$_1$ is C$_{2-6}$alkylene, —C$_{2-3}$alkylene-Q—C$_{2-3}$alkylene- in which Q is —O— or —NR$_2$—, C$_{3-4}$alkylene monosubstituted by hydroxy,

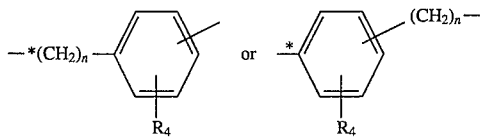

in which n is 0 or an integer 1 to 4,
R$_4$ is hydrogen, C$_{1-4}$alkyl, C$_{1-4}$alkoxy, carboxy or sulpho, and the marked carbon atom is attached to the —NR$_2$ group which is bound to a carbon atom of the triazine ring,
with the proviso that at least one of R$_D$ and R$_K$ is a Z$_X$-containing radical in which Z$_a$ is

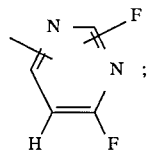

or R$_D$ and R$_K$, when R$_1$ is hydrogen or sulpho, are —NR$_2$—Z$_y$, where both groups Z$_y$ are the same and each Z$_y$ is Z$_b$ or

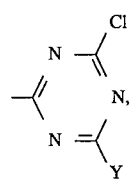

in which

Y is —NR$_5$R$_6$, —W$_1$—Z$_y$, or —NR$_2$—W$_2$—SO$_2$—X
wherein
R$_5$ is hydrogen, C$_{1-4}$alkyl or C$_{2-4}$alkyl monosubstituted by hydroxy, cyano or sulpho;
R$_6$ is hydrogen, C$_{1-4}$alkyl, C$_{2-4}$alkyl monosubstituted by hydroxy, cyano or sulpho;
phenyl, phenyl substituted by one or two substituents selected from chloro,
C$_{1-4}$alkyl, C$_{1-4}$alkoxy and sulpho, phenyl(C$_{1-4}$alkyl) or phenyl(C$_{1-4}$alkyl) the phenyl ring of which is substituted by one or two substituents selected from chloro, C$_{1-4}$alkyl, C$_{1-4}$alkoxy and sulpho, or
—NR$_5$R$_6$ is piperidino or morpholino;
W$_1$ and R$_2$ are as defined above;
W$_2$ is a linear or branched C$_{2-8}$alkylene which may be interrupted by —O— or —NR$_2$—, and which may be further substituted by hydroxy or —OSO$_3$H aliphatic; or a 1,3- or 1,4-phenylene which is unsubstituted or substituted or monosubstituted by sulpho or carboxy;
X is —CH=CH$_2$ or —CH$_2$CH$_2$—T$_x$ in which T$_x$ is hydroxy, or a radical which is split off under alkaline conditions; and
Z$_b$ is a pyrimidinyl radical of the formulae,

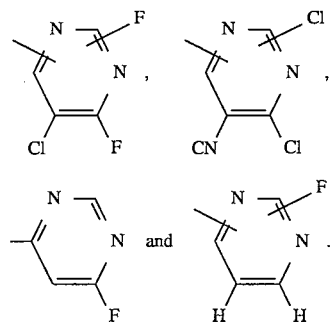

2. A compound according to claim 1, in which R$_1$ is R$_{1a}$, where R$_{1a}$ is hydrogen, chloro, methyl, methoxy, carboxy or sulpho.

3. A compound according to claim 2, in which each R$_2$ is R$_{2a}$, where each R$_{2a}$ is independently hydrogen, methyl, ethyl or 2-hydroxyethyl.

4. A compound according to claim 1, in which W$_2$ is W$_{2a}$, where W$_{2a}$ is

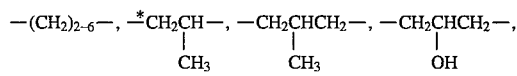
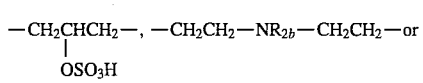

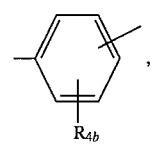

in which the phenylene group is bound in the 1,3- or 1,4-positions, R$_{4b}$ is hydrogen or sulpho, and R$_{2b}$ is hydrogen or methyl.

5. A compound according to claim 1, in which $Z_x$ is $Z_x'$, where $Z_x'$ is $Z_a'$ or

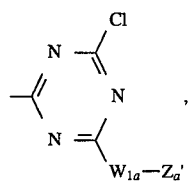

in which $Z_a'$ is

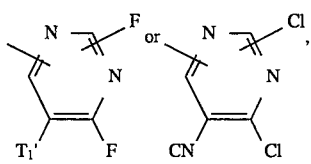

wherein $T_1'$ is hydrogen or chloro, and $W_{1a}$ is

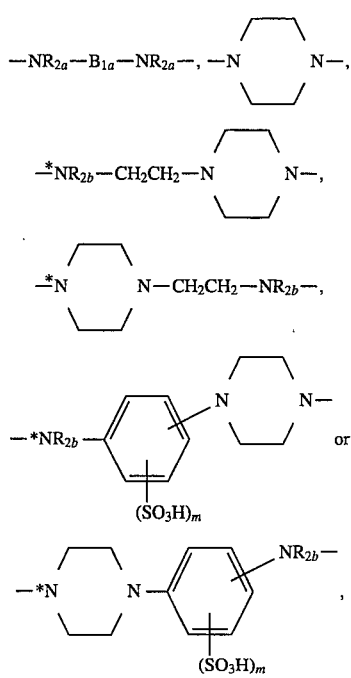

in which
each $R_{2a}$ is independently hydrogen, methyl, ethyl or 2-hydroxyethyl,
$R_{2b}$ is hydrogen or methyl,
$B_{1a}$ is $C_{2-3}$ alkylene, —CH$_2$CH$_2$—O—CH$_2$CH$_2$—, —CH$_2$CH$_2$—NR$_{2b}$—CH$_2$CH$_2$—, monohydroxy-substituted $C_{3-4}$alkylene,

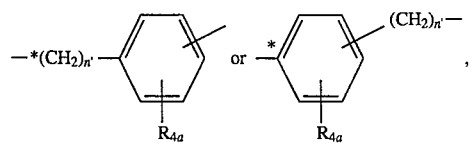

wherein
$R_{4a}$ is hydrogen, methyl, methoxy, carboxy or sulpho, and
n' is 0 or 1,
and m is 0 or 1, and the marked nitrogen atom is bound to a carbon atom of the triazine ring.

6. A compound claim 4, in which $Z_y$ is $Z_y'$, where $Z_y'$ is $Z_b'$ or

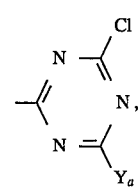

is which
$Z_b'$ has one of the formulae

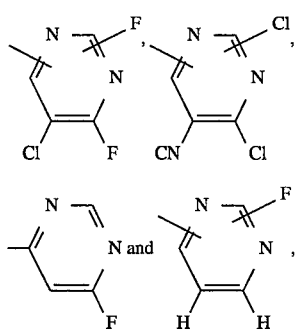

and $Y_a$ is —NR$_5$R$_6$, —W$_{1a}$—Z$_b'$ or —NR$_{2a}$—W$_{2a}$—SO$_2$—X$_a$, in which
$R_5$ is hydrogen, $C_{1-4}$alkyl or $C_{2-4}$alkyl which is monosubstituted by hydroxy, cyano or sulpho, and
$R_6$ is hydrogen, $C_{1-4}$alkyl, $C_{2-4}$alkyl monosubstituted by hydroxy, cyano or sulpho; phenyl, phenyl substituted by one or two substituents selected form chloro, $C_{1-4}$alkyl, $C_{1-4}$alkoxy and sulpho, phenyl($C_{1-4}$alkyl) or phenyl($C_{1-4}$alkyl) the phenyl ring of which is substituted by one or two substituents selected from chloro, $C_{1-4}$alkyl, $C_{1-4}$alkoxy and sulpho, or
—NR$_5$R$_6$ is piperidino or morpholino,
$W_{1a}$ is

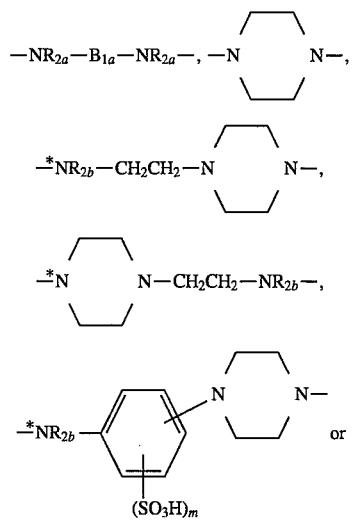

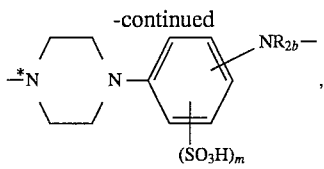

in which
each
$R_{2a}$ is independently hydrogen, methyl, ethyl or 2-hydroxyethyl,
$R_{2b}$ is hydrogen or methyl,
$B_{1a}$ is $C_{2-3}$alkylene, —CH$_2$CH$_2$—O—CH$_2$CH$_2$—, —CH$_2$CH$_2$—NR$_{2b}$—CH$_2$CH$_2$—, monohydroxy-substituted $C_{3-4}$alkylene,

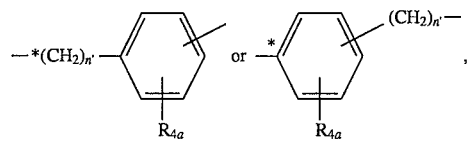

wherein
$R_{4a}$ is hydrogen, methyl, methoxy, carboxy or sulpho, and
n' is 0 or 1,
and m is 0 or 1, and the marked nitrogen atom is bound to a carbon atom of the triazine ring,
$R_{2a}$ is as defined above,
$W_{2a}$ is as defined in claim 4, and
$X_a$ —CH=CH$_2$, —CH$_2$CH$_2$OH or —CH$_2$CH$_2$OSO$_3$H.

7. A compound according to claim 1, which corresponds to formula Ia or Ib,

Z is

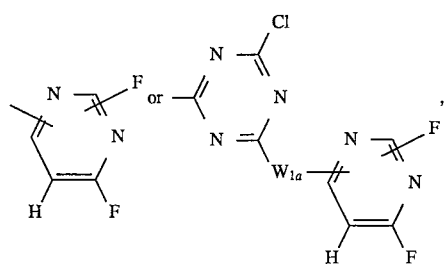

wherein
$W_{1a}$ is

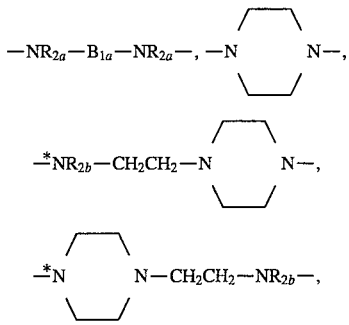

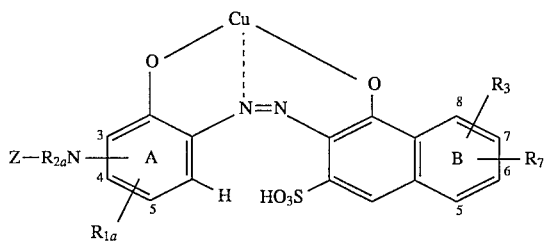  Ia

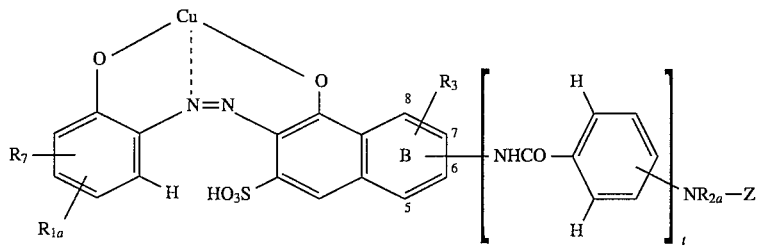  Ib or salts thereof, in which
$R_{1a}$ is hydrogen, chloro, methyl, methoxy, carboxy or sulpho,
$R_{2a}$ is hydrogen, methyl, ethyl or 2-hydroxyethyl,
each of $R_3$ and $R_7$ is independently hydrogen or sulpho,
t is 0 or 1, and -continued

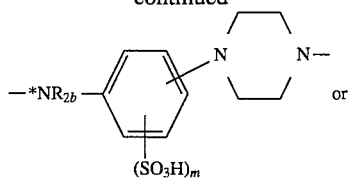 or

-continued

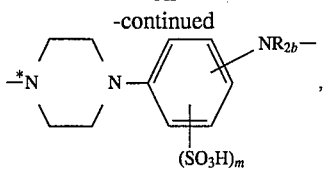

in which
each
R$_{2a}$ is independently hydrogen, methyl, ethyl or 2-hydroxyethyl,
R$_{2b}$ is hydrogen or methyl,
B$_{1a}$ is C$_{2-3}$alkylene, —CH$_2$CH$_2$—O—CH$_2$CH$_2$—, —CH$_2$CH$_2$—NR$_{2b}$—CH$_2$CH$_2$—, monohydroxy-substituted C$_{3-4}$alkylene,

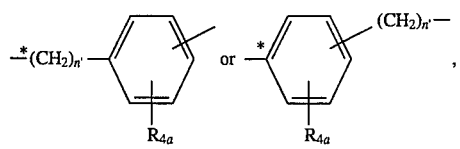

wherein
R$_{4a}$ is hydrogen, methyl, methoxy, carboxy or sulpho, and
n' is 0 or 1,
and m is 0 or 1, and the marked nitrogen atom is bound to a carbon atom of the triazine ring.

8. A compound according to claim 7, in which R$_{1a}$ is hydrogen or sulpho and R$_{2a}$ is hydrogen or methyl.

9. A compound according to claim 7, in which W$_{1a}$ is W$_{1c}$, where W$_{1c}$ is —NH—B$_{1c}$—NH—, and B$_{1c}$ is —CH$_2$CH$_2$—, —CH$_2$CH$_2$CH$_2$—,

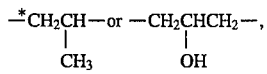

in which the marked carbon atom is bound to the —NH group which is attached to a carbon atom of the triazine ring.

10. A compound of formula Ia according to claim 7, in which in ring B one of R$_3$ and R$_7$ is hydrogen and the other is sulpho in the 6-position.

11. A compound according to claim 1, which corresponds to formula Ic,

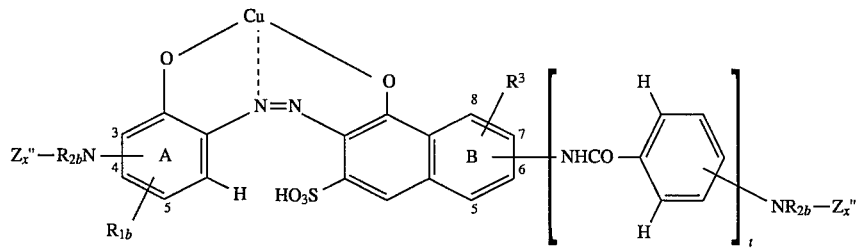

Ic or salts thereof, in which the two Z$_x$" may be the same or different and are Z$_a$' or

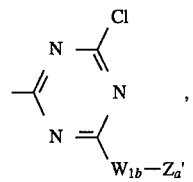

wherein
Z$_a$' is

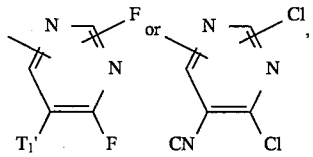

in which T$_1$' is hydrogen or chloro,
and W$_{1b}$ is —NR$_{2b}$—B$_{1b}$—NR$_{2b}$— or

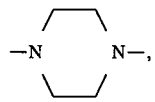

in which B$_{1b}$ is C$_{2-3}$alkylene, —CH$_2$CH$_2$—NH—CH$_2$CH$_2$—,

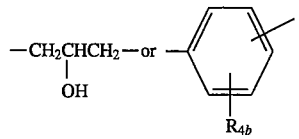

wherein
R$_{4b}$ is hydrogen or sulpho, with the proviso that at least one of Z$_x$" is

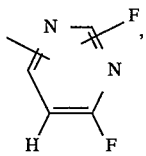

R$_{1b}$ is hydrogen or sulpho,
each R$_{2b}$ is independently hydrogen or methyl, $R_3$ is hydrogen or sulpho, and
t is 0 or 1.

12. A compound according to claim 11, in which each $R_{2b}$ is hydrogen.

13. A compound according to claim 11, in which the two $Z_x''$ are the same and are $Z_x'''$, where each $Z_x'''$ is

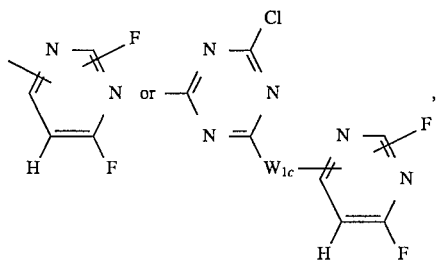

in which $W_{1c}$ is —NH—$B_{1c}$—NH— and $B_{1c}$ is —CH$_2$CH$_2$—, —CH$_2$CH$_2$CH$_2$—,

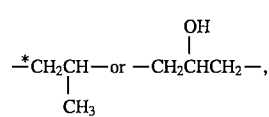

in which the marked carbon atom is bound to the —NH group which is attached to a carbon atom of the triazine ring.

14. A compound according to claim 13, in which both $Z_x'''$ are

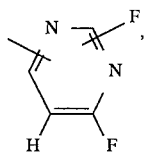

$R_3$ is hydrogen, t is 0 and —NR$_{2b}$—$Z_x'''$ is in the 7-position of ring B.

15. A compound according to claim 1, which corresponds to formula Id,

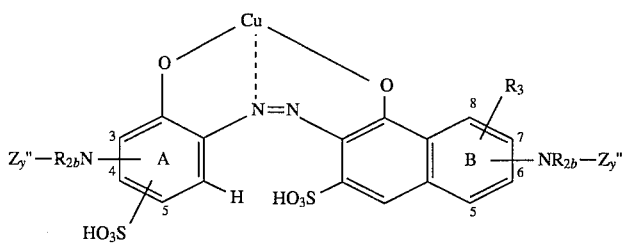

or salts thereof, in which each $R_{2b}$ is independently hydrogen or methyl, $R_3$ is hydrogen or sulpho, and the two $Z_y''$ are the same and each $Z_y''$ is $Z_b'$ or

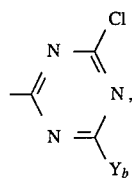

wherein

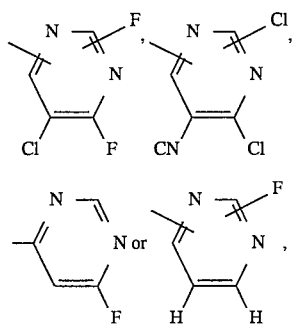

and $Y_b$ is —NR$_{5a}$R$_{6a}$, —W$_{1b}$—Z$_b'$ or —NR$_{2b}$—SO$_2$—X$_b$, in which $R_{2b}$ and $Z_b'$ are as defined above, $R_{5a}$ is hydrogen, methyl, ethyl or 2-hydroxyethyl, and $R_{6a}$ is hydrogen, methyl, ethyl, 2-hydroxyethyl, phenyl or phenyl substituted by one or two substituents selected from methyl and sulpho, or —NR$_{5a}$R$_{6a}$ is morpholino, $W_{1b}$ is —NR$_{2b}$—B$_{1b}$—NR$_{2b}$— or

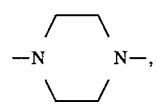

wherein each $R_{2b}$ is independently as defined above, and $B_{1b}$ is C$_{2-3}$alkylene, —CH$_2$CH$_2$—NH—CH$_2$CH$_2$—,

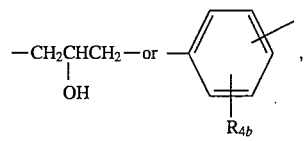

wherein $R_{4b}$ is hydrogen or sulpho,

Id $W_{2b}$ is —(CH$_2$)$_{2-4}$— or

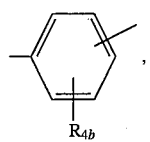

wherein $R_{4b}$ is a defined above, and the phenylene group is bound to the 1,3- or 1,4-positions, and $X_b$ is —CH=CH$_2$ or —CH$_2$CH$_2$OSO$_3$H.

16. A compound according to claim 15, in which each $R_{2b}$ is hydrogen.

17. A compound according to claim 15, in which each $Z_y''$ is $Z_y'''$ as $Z_b"$ or

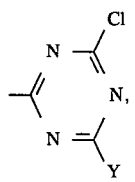

where $Z_b"$ is

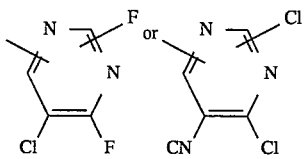

and $Y_c$ is $-W_{1c}-Z_b"$ or $-NH-W_{2b}-SO_2-X_c$, in which $Z_b"$ is as defined above, $W_{1c}$ is $-NH-B_{1c}-NH-$, wherein $B_{1c}$ is $-CH_2CH_2-$, $-CH_2CH_2CH_2-$, $$-\overset{*}{C}H_2\underset{\underset{CH_3}{|}}{C}H- \text{ or } -CH_2\underset{\underset{OH}{|}}{C}HCH_2-,$$

in which the marked carbon atom is bound to the —NH group which is attached to a carbon atom of the triazine ring, and $X_c$ is $-CH_2CH_2OSO_3H$.

18. A process for dyeing or printing a hydroxy group- or nitrogen-containing organic substrate comprising applying to the substrate a compound according to claim 1, or a mixture thereof.

19. A process according to claim 18, wherein the substrate is a fibre material comprising natural or regenerated cellulose.

* * * * *